United States Patent Office 3,605,318
Patented Sept. 20, 1971

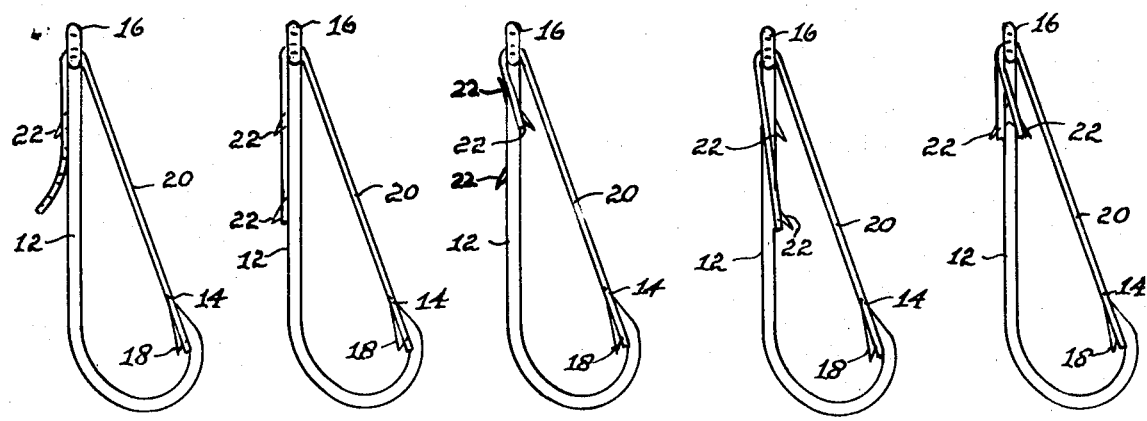
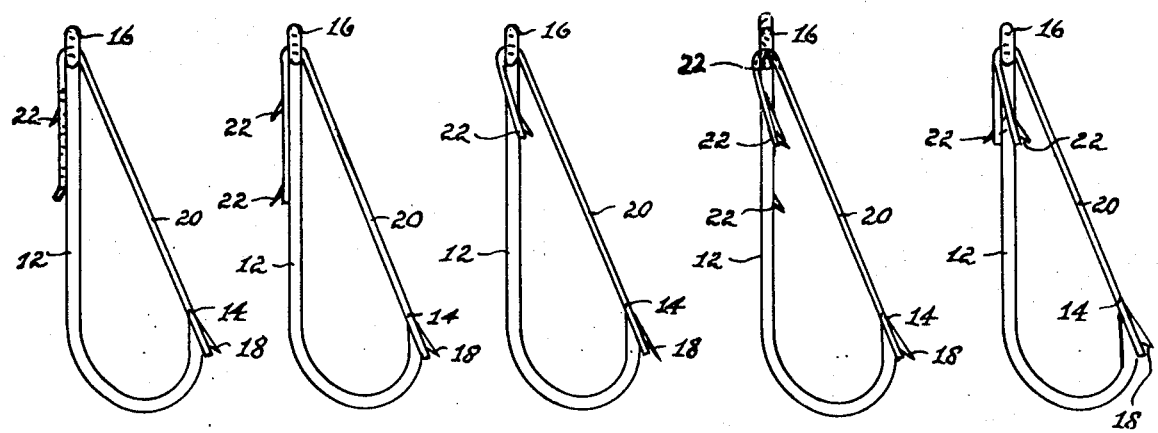
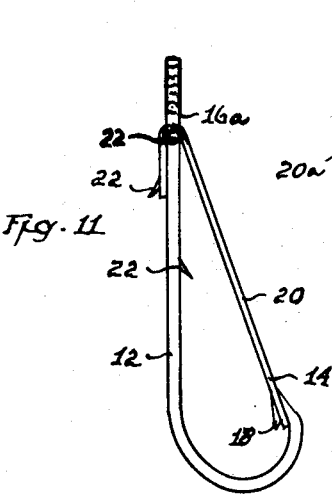
Mona Santo and
Michael W. Santo III
INVENTORS

3,605,318
WEEDLESS FISHHOOK
Mona Santo and Michael W. Santo III, both of 47 Lake
Drive, Roosevelt, N.J. 08555
Filed Mar. 27, 1970, Ser. No. 23,224
Int. Cl. A01k 83/00
U.S. Cl. 43—43.4
4 Claims

ABSTRACT OF THE DISCLOSURE

This invention relates to a fishhook in which the point is shielded by a resilient guard member looped over the barb at the point end of the hook and said guard member being extended to and through the eye of the hook and said guard member being further extended to and around a barb located on the shank portion of the hook to preclude snagging of the hook when drawn through weeds and the like.

The present invention contemplates the provision of a novel form of fish hook having a barb located on the reversely bent portion of the hook, said barb being adjacent to or on a plane with the sharp pointed tip together with the provision of a resilient guard member such as an endless elastic band or strip adapted to be positioned to bridge the gap between the pointed tip portion of the hook and the eye of the hook by means of securing said guard element to the barb at the pointed tip of the hook and extending said guard member to and through the eye of the hook and further extending said guard member to and around a barb on the shank of the hook.

One of the objects of this invention is to provide a weedless fish hook having a resilient guard member secured at one end to the barb at the pointed tip and the opposite portion of the guard member extended to and through the eye and said guard member being further extended to and around a barb on the shank portion of the hook, said barb at the pointed tip and said pointed tip being so correlated to each other and to the eye at the free end of the hook as to cause the guard member to close the gap between the two ends of the hook and in so doing form a protective shield for the pointed tip of the hook.

Another object of this invention is to eliminate the need for a specific size guard member for a particular size hook by the placing of numerous guard member anchoring barbs on the shank portion of the hook.

A further object of this invention is that it may be used with or without a guard member.

The objects and advantages of the invention will be apparent after studying the following description and the accompanying drawings, in which:

FIGS. 1 and 6 are side views of the invention showing the guard member to be a resilient strip attached to the primary barb at the pointed tip and extended to and through the eye to and around a downward pointing auxiliary barb.

FIGS. 2, 4, 5, 7, and 10 are side views of the improved fish hook showing more than one downward pointing auxiliary barb and some of the ways of arranging them on the shank.

FIGS. 3 and 9 are side views of the invention showing a combination of upward and downward pointing auxiliary barbs and some of the ways of arranging them on the shank.

FIG. 11 is a side view of the invention showing a fish hook of the snelled or eyeless type with upward and downward pointing auxiliary barbs on the shank.

FIGS. 1, 2, 3, 4, 5 and 11 are side views of the improved fish hook showing the primary barb to be on the under side of the pointed tip.

FIGS. 6, 7, 8, 9 and 10 are side views of the improved fish hook showing the primary barb to be on the outer side of the pointed tip.

FIG. 9 is a side view of the invention showing one end of the guard member looped over a single upward pointing auxiliary barb on the shank and extended further to and around a downward pointing auxiliary barb.

FIG. 11 is a side view of the invention showing the guard member to be looped over two upward pointing auxiliary barbs and further extended to and around a downward pointing auxiliary barb.

FIGS. 5 and 10 are side views of the invention showing one end of the guard member attached to a pair of downward pointing auxiliary barbs on the shank.

FIGS. 2, 3, 4, 5, 7, 8, 9, 10 and 11 are side views of the invention showing the guard member to be of the endless type.

FIGS. 12, 13 and 14 show various types of the resilient strip which may have any number of openings or none at all and may be in colors and may vary in length and width and thickness.

FIG. 15 is a side view of the invention showing the guard member looped under a downward pointing auxiliary barb and further extended to and around an upward pointing auxiliary barb.

Referring to the drawings in which like numerals designate like parts in the views, FIGS. 1 thru 10 show an embodiment of the invention with an eye 16 located at one end of the shank portion 12 auxiliary barbs 22 placed along said shank portion; said shank portion being further extended and bent in a semi-circular contour terminating in a pointed tip 14 with a primary barb 18 being located at or near the pointed tip 14 a guard member 20 looped over the primary barb and extended to and through the eye 16 and further extended to and around at least one of the auxiliary barbs 22.

The fish hook as shown in FIG. 11 is the snelled variety or that type hook without an eye. The guard member 20 is looped over the primary barb 18 and is extended to at least one auxiliary barb 22 and further extended to and around at least one other auxiliary barb 22.

The fish hook as shown in FIG. 15 has an eye 16 located at one end of the shank 12 but auxiliary barbs 22 may be used for the attachment of the guard element at the eye end of the hook by looping the guard member 20 over the primary barb 18 and extending said member to and around an auxiliary barb 22 and further extending the guard member to and around at least one other auxiliary barb 22.

The fish hooks as shown in all the figures are made of wire or any material suitable to the proper forming thereof. The barbs or anchoring points formed in conjunction with this invention are of a type easily placed on formed on the fish hooks.

It will be apparent that this invention may be embodied in all types of fish hooks including singles, doubles, trebles or in the many types of artificial baits or lures and the guard members used with this invention may be in colors or plain and may use streamers or the like as part of or as an attachment thereto.

Various forms of the invention being disclosed does not limit the construction as disclosed, but is capable of variation and modification.

We claim:

1. The combination of a fish hook having an eye at one end thereof, a shank extending from said eye, at least one auxiliary barb on the shank, said shank having a return bend at the opposite end thereof, terminating in a pointed tip, a primary barb located substantially at the pointed tip, said pointed tip and primary barb lying in a plane with said eye, said pointed tip being directed toward said eye, a resilient guard member looped over the primary barb and extended to and through the eye and further extended to and around at least one auxiliary barb.

2. The combination of a fish hook having an eye at one end thereof, a shank extending from said eye, at least one auxiliary barb on the shank, said shank having a return bend at the opposite end thereof, terminating in a pointed tip, a primary barb located substantially at the pointed tip, said pointed tip and primary barb lying in a plane with and pointing toward at least one auxiliary barb, a resilient guard member looped over the primary barb and extended to and around at least one auxiliary barb that lies in the same plane with the pointed tip, and further extended to and around at least one other auxiliary barb.

3. The combination of a fish hook having an eye at one end thereof, a shank extending from said eye, at least one auxiliary barb on the shank, said shank having a return bend at the opposite end thereof, terminating in a pointed tip, a primary barb located substantially at the pointed tip, said pointed tip and primary barb lying in a plane with and pointing toward at least one auxiliary barb, a resilient guard member looped over the primary barb and extended to and around at least one auxiliary barb and further extended to and looped through the eye of the hook.

4. The combination of a fish hook having at least one auxiliary barb substantially at the free end of the shank, said shank having a return bend at the opposite end thereof, terminating in a pointed tip, a primary barb located substantially at the pointed tip, said pointed tip and primary barb lying in a plane with and pointing toward at least one auxiliary barb, a resilient guard member looped over the primary barb and extended to and around at least one auxiliary barb that lies in the same plane with the pointed tip, and further extended to and around at least one other auxiliary barb.

References Cited
UNITED STATES PATENTS

| | | | |
|---|---|---|---|
| 2,651,134 | 9/1953 | Kemmerer | 43—43.4 |
| 2,735,210 | 2/1956 | Hinkal | 43—43.6 |
| 3,333,359 | 8/1967 | Barker | 43—44.8X |
| 3,562,948 | 2/1971 | Santo et al. | 43—43.4 |

ALDRICH F. MEDBERY, Primary Examiner

G. M. YAHWAK, Assistant Examiner

U.S. Cl. X.R.

43—43.6